US011062017B2

(12) United States Patent
Berdy et al.

(10) Patent No.: US 11,062,017 B2
(45) Date of Patent: Jul. 13, 2021

(54) SCOPING MECHANISM FOR GLOBALLY UNIQUE DEVICE IDENTIFICATION

(71) Applicant: Microsoft Technology Licensing, LLC, Redmond, WA (US)

(72) Inventors: Nicole Elaine Berdy, Kirkland, WA (US); Affan A. Dar, Redmond, WA (US); Simon D. Porter, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 239 days.

(21) Appl. No.: 16/112,560

(22) Filed: Aug. 24, 2018

(65) Prior Publication Data

US 2020/0065473 A1 Feb. 27, 2020

(51) Int. Cl.
*G06F 21/45* (2013.01)
*H04L 29/08* (2006.01)
*H04L 12/24* (2006.01)
*H04L 29/06* (2006.01)

(52) U.S. Cl.
CPC .......... *G06F 21/45* (2013.01); *H04L 41/0806* (2013.01); *H04L 63/08* (2013.01); *H04L 67/12* (2013.01)

(58) Field of Classification Search
CPC .......... G06F 21/45; H04L 63/08; H04L 67/12
USPC .......................................................... 726/6
See application file for complete search history.

(56) References Cited

U.S. PATENT DOCUMENTS

| 8,613,055 | B1 * | 12/2013 | Tomilson | G06F 21/335 |
| | | | | 726/4 |
| 9,083,770 | B1 * | 7/2015 | Drose | H04L 65/608 |
| 9,210,534 | B1 * | 12/2015 | Matthieu | H04L 67/18 |
| 9,762,556 | B2 | 9/2017 | James et al. | |
| 2015/0341446 | A1 | 11/2015 | Nguyen et al. | |
| 2016/0205078 | A1 * | 7/2016 | James | H04L 63/0823 |
| | | | | 713/171 |
| 2016/0337181 | A1 | 11/2016 | Cathrow et al. | |

(Continued)

OTHER PUBLICATIONS

"IoT Addressing and Registry Device Search, Discovery and Access", Retrieved from: http://oyokey.com/iot-addressing-registry/, Retrieved on Jun. 29, 2018, 4 Pages.

(Continued)

*Primary Examiner* — Thanhnga B Truong
*Assistant Examiner* — Angela R Holmes
(74) *Attorney, Agent, or Firm* — Holzer Patel Drennan

(57) ABSTRACT

A method for uniquely authenticating a device provides for receiving a scoping request, allocating a scope ID responsive to the request, and storing one or more device identification credentials in a database. Each device identification credential stored in the database includes the allocated scope ID and a device ID provided within the scoping request. The method further provides for receiving a registration request specifying a device identification credential and authenticating the specified device identification credential by confirming a match between the specified device identification credential and one of the device identification credentials stored in the database. The method further provides for provisioning the device with initial configuration information responsive to the authentication.

20 Claims, 4 Drawing Sheets

(56) References Cited

U.S. PATENT DOCUMENTS

2017/0359338 A1* 12/2017 Tschofenig ............. G06F 21/34
2018/0338242 A1* 11/2018 Li ................... H04W 12/00512

OTHER PUBLICATIONS

Berdy, et al., "IoT Hub Device Provisioning Service device concepts", Retrieved from: https://docs.microsoft.com/en-us/azure/iot-dps/concepts-device, Sep. 5, 2017, 2 Pages.

Berdy, Nicole, "Unique identities are hard: How I learned to stop worrying and love the ID scope", Retrieved from: https://azure.microsoft.com/en-us/blog/unique-identities-are-hard-or-how-i-learned-to-stop-worrying-and-love-the-id-scope/, Apr. 2, 2018, 9 Pages.

Drake, Chris, "App-ID Registry: Securing the Internet of Things (IoT)", Retrieved from: https://sites.atis.org/insights/app-id-registry-securing-the-internet-of-things-iot/, Jul. 17, 2017, 6 Pages.

* cited by examiner

SCOPING MECHANISM FOR GLOBALLY UNIQUE DEVICE IDENTIFICATION

BACKGROUND

When first introduced to the market, smart devices were commonly hardcoded with information allowing each device to self-identify a corresponding internet-of-things (IOT) solution (e.g., a cloud-based smart hub) and initiate communications with that IOT solution when the smart device was turned-on and initialized by a user. For example, the smart device may be a smart sensor, plug, lightbulb, and other devices (e.g., thermostat, doorbell, security camera) that is hardcoded to "wake-up" and begin registering itself with one or more different cloud-based IOT solutions, such as Nokia Smart Home®, Google Home®, Samsung SmartThings®, Nest®, Phillips Hue, SmartLife, Garmin Connect®, etc.

Consumer-driven expansion of the smart device market has led to increased demands for cross-solution compatibility and increased affordability. These driving factors have created a market for third party manufacturers and distributors that may not be independently overseen by or partnered with a single IOT solution provider. As a result, the IOT solution provider does not always have oversight into or control over device naming conventions that are hardcoded during manufacturing and later used when configuring and registering a device with a particular IOT solution. This can create problems when different manufacturers use identical naming conventions for devices that eventually attempt to register with a same IOT solution.

BRIEF DESCRIPTIONS OF THE DRAWINGS

SUMMARY

Figure 1:
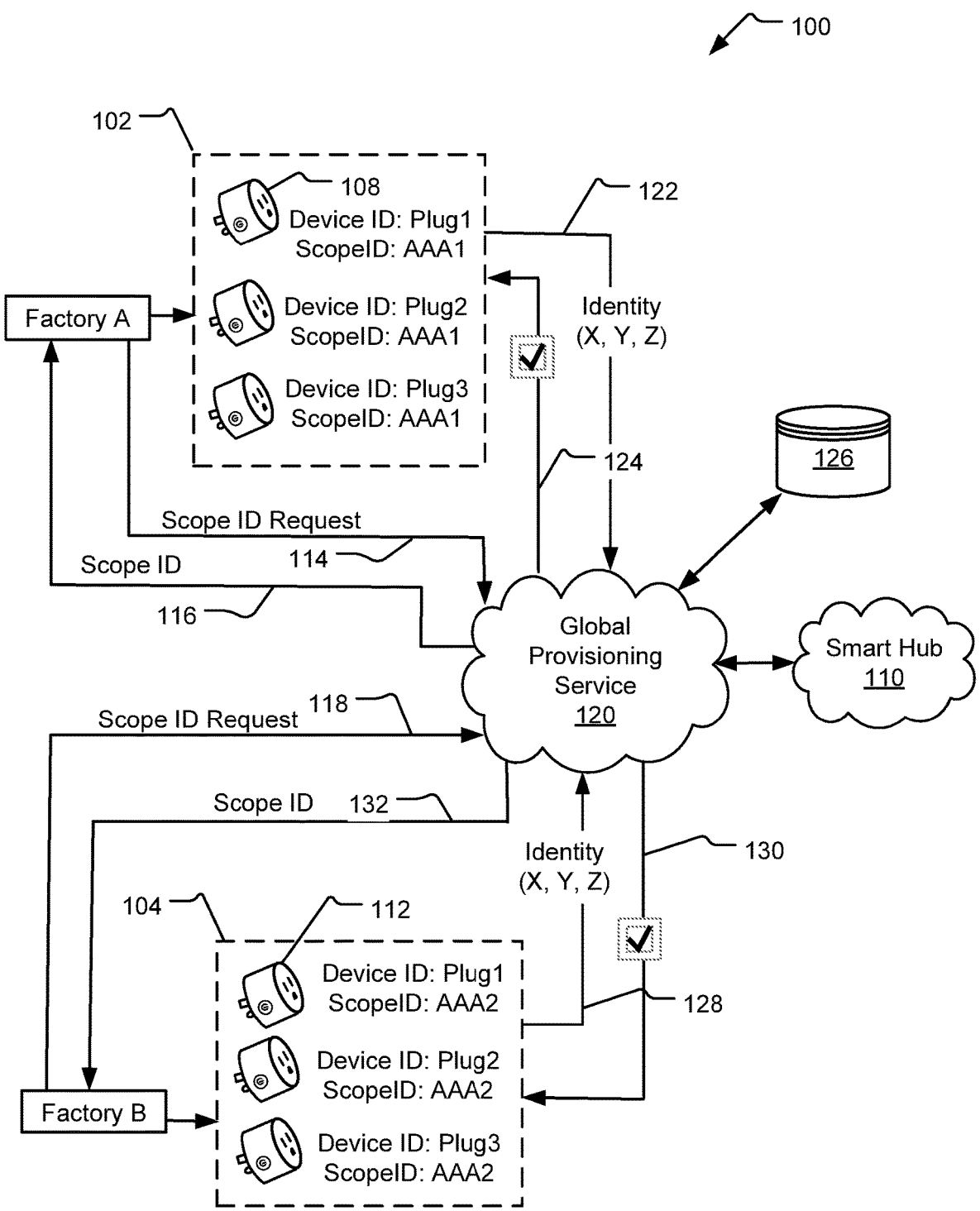
FIG. 1 illustrates an example system that utilizes a device identification scoping mechanism as part of a device identity to allow each device to be uniquely identified on a global scale including multiple manufacturers and web-based solution service providers.

A method for uniquely authenticating a device includes allocating a scope ID and storing one or more device identification credentials in a database responsive to a scoping request. Each device identification credential stored in the database includes the allocated scope ID and a device ID that is identified by the scoping request. The method further provides for receiving a registration request specifying a device identification credential and authenticating the specified device identification credential by confirming a match between the specified device identification credential and one of the device identification credentials stored in the database. Based on the authentication, the device is provisioned with initial configuration information.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

In the smart device market, there exist a number of third-party products that are marketed for boot-strap use with popular IOT solutions. For example, there exist a large number of different smart plugs and switches advertised and sold as "compatible with Nokia Smart Home." Since these products are designed to boot-strap to the existing software infrastructure of the IOT solution, the solution provider (Nokia) may not have oversight into or control over device naming conventions that are used when a device is registered and configured for use by the IOT solution.

If two different manufacturing facilities happen to use identical naming conventions, there exists a risk that two products may be hardcoded with a same device ID (e.g., lightbulb000, lightbulb001). If both of these devices try to self-register with a same IOT solution, the second device to attempt registration may, in some cases, receive an error or be mistaken for the first device since the IOT solution.

In addition to the above-described challenges arising from in-factory selection of locally-unique identifiers that are non-unique on a global scale, many current manufacturing processes hardcode smart devices to include connection information that the device uses to initiate communications with a specific IOT solution (also referred to herein as a smart hub). If this connection is hardcoded at the factory, the IOT solution for each smart device is defined very early in production. In some cases, a device manufacturer may not know what IOT solution each individual product is eventually going to be used with. For example, a device manufacturer may make a smart sensor for a wireless digital scale without knowing what end product the scale is to be integrated into (e.g., a treadmill, a bathroom scale, airport luggage scale) let alone, what IOT solution the scale may eventually support integration with (e.g., fitbit.com, weightgurus.com, AIFit.com). Hardcoding this smart hub connection information complicates the manufacturing process for those manufacturers that wish to make identical products that may eventually be advertised and sold as compatible with different IOT solutions.

The herein disclosed technology facilitates the provisioning of identity credentials to each smart device that are guaranteed to be unique when presented to an IOT solution regardless of the naming convention implemented by the device's manufacturer or the number of different manufacturers whose products are designed to be compatible with a same IOT solution. In one implementation, these unique identity credentials are generated via a series of operations that can be easily integrated into any existing smart device supply chain. Additionally, the disclosed device identification scheme can be implemented without hardcoding IOT hub connection information at the factory, which increases the ease of global bootstrapping between different smart products and different IOT solutions.

FIG. 1 illustrates an example system 100 that utilizes a device identification scoping mechanism as part of a device identity to allow each individual devices to be uniquely identifiable on a global scale that includes multiple manufacturers and IOT solution providers. The system 100 includes two example factories, factory A and factory B. each of the factories A and B manufacture smart devices (e.g., smart devices 102, 104) of a same device type. In general, the term smart device refers to an electronic device with processing and data transmission capabilities. By example and without limitation, the smart devices 102, 104 in FIG. 1 are shown and described as being smart plugs (e.g., a smart plug 108), which may be understood as being an electrical outlet adapter that communicates with and is command through a web-based IOT solution (e.g., a smart hub). For example, a user may interact with a mobile application provided by an IOT solution to remotely control the flow of power between the smart plug 108 and another physically coupled device. Smart plugs represent just one of multiple countless types of smart devices that may use the disclosed device identification techniques.

Each of the factories A and B internally designates a device naming convention that is used to generate a device identifier, referred to herein as a device ID) for each one of the smart devices 102, 104. For example, a device ID may be hardcoded within firmware of each one of the smart devices 102, 104 and used by the device to identify itself to external processing entities.

Although initial configuration procedures may vary somewhat between different smart devices and corresponding IOT solutions, some smart devices are configured to initiate actions for self-registering with a smart hub 110 when awoken by a user for the first time from a low or no-power state. In one example implementation, a user connects a mobile application on a personal computing device to a Wi-Fi signal that is emitted from a smart device (e.g., the smart plug 108) when the smart device is first turned on for the first time after being unwrapped from store packaging. The mobile application provides the device with a user-designated private key (e.g., the user's password for the mobile application) and this key becomes part of the device's identification credential. The device then takes one or more actions to initiate registration with a corresponding IOT solution (e.g., a smart hub 110) in order to obtain initial configuration information.

Some smart devices may be programmed to communicate directly with a designated smart hub. For example, a smart device may be hardcoded with connection information for the smart hub 110. Other devices, including those shown in FIG. 1, are configured to begin registering themselves with a global provisioning service 120. For example, the smart plug 108 may be hardcoded to include connection information for connecting to a designated provisioning service endpoint, such as the global provisioning service 120. The global provisioning service 120 may perform operations for registering the smart plug 108 with the smart hub 110 and provisioning the device with the initial configuration information provided by the smart hub 110.

One benefit of using the global provisioning service 120 (as shown in FIG. 1) is that this solution does not require hardcoding of connection information for a designated IOT solution. This allows the smart hub to be designated at a later point in the supply chain, after the smart devices leave the manufacturing facility. The use of the global provisioning service 120 can simplify manufacturing by standardizing hardcoded information and thereby allowing a manufacturer to produce identical products with identical hardcoded information that may be individually used in conjunction with different IOT solutions.

In FIG. 1, the smart devices 102, 104 are not hardcoded within connection information for a particular smart hub. Rather, the smart devices 101, 104 are hardcoded with connection information and provisioning instructions for contacting the global provisioning service 120. During initial provisioning each one of the smart devices 104, 106, the devices each provide the global provisioning service 120 with an self-identifying credential, referred to herein as a device identification credential. In one implementation, each device identification credential includes three components—a device ID, a scope ID, a key (e.g., a user-designated password).

The device identifier, also referred to herein as the device ID, may be hardcoded within each device and selected by the manufacturer while the device is at the factory. Internally, each of factories A and B may implement measures to ensure that the factory-assigned device IDs are guaranteed to be locally-unique within the corresponding facility or a jointly operated group of facilities. For example, Factory A produces the smart devices 102 and locally assigns device IDs "Plug1," "Plug2," and "Plug3," while ensuring that no other devices manufactured by Factory A have these device IDs.

Although Factory B also implements a device ID selection scheme that guarantees local uniqueness, some of the smart devices 104 manufactured at Factory B are assigned to a range of device IDs (e.g., Plug1, Plug2, and Plug3) that identically match device IDs assigned at Factory A. During communications with a smart hub or a global provisioning service 120, complications can arise if two or more different devices self-identify with the same identification credentials.

If not for a scope ID that is also included in the device identification credentials of the smart devices 102, 104, different smart devices from Factory A and Factory B may inadvertently provide the global provisioning service 120 with identical device IDs. In cases where the user selects a commonly-used key (e.g., password='1234'), the global provisioning service could plausibly receive duplicate device identification credentials of the form (device ID, key) from two different smart devices. For example, the smart plug 108 may provide a device identification credential of the form (X, Y) that is identical to the identification credential (X, Y) of another smart plug 112. If this were to occur, problems may result when smart plug 112 attempts to register with the global provisioning service 120 after the smart plug 108 has already registered. For example, the second registration request for the smart plug 112 may be rejected or, in some cases, the smart plug 112 may effectively hijack the identity of the smart plug 108 because the global provisioning service 120 has no way of telling the two devices apart. In the latter scenario (hijacked identity), the global provisioning service 120 may misconfigure one or both of the smart plugs 108, 112 according to commands, preferences, or settings of incorrect user accounts.

For this reason, it is desirable to implement a global naming convention scheme that allows each device to be uniquely identifiable by an associated IOT solution despite the lack of control that the IOT solution provider may exert over the specific naming conventions implemented by various different manufacturers. This is accomplished in FIG. 1 by the allocation of a scope ID.

The scope ID can be generally understood as an ID that represents a point in time when a specific manufacturer first informs the global provisioning service 120 of the existence of a series of newly-manufactured smart devices. By tying a locally-generated device ID to a globally-generated scope ID representing a specific point in time when the manufacturer makes a request, the device is expanded in a way that makes it possible to uniquely identify the device on the global scale.

During production of the smart devices 102, 104, each of factories A and B contact the global provisioning service 120 to request a scope ID for a range of devices. In the illustrated example, Factory A transmits a scoping request 114 to the global provisioning service 120. The scoping request identifies a range of devices that are to be assigned to the requested scope ID. In one implementation, the scoping request identifies a range of device IDs (e.g., Plug1, Plug2, Plug3) for devices that are to be assigned to the returned scope ID.

The global provisioning service 120 generates a scope ID (e.g., AAA1) in response to the request and transmits a scope ID designation 116 back to Factory A. Additionally, the global provisioning service 120 saves the scope ID in association with the designated device IDs within the device identity database 126.

At another subsequent point in time, Factory B transmits a scoping request 118 to the global provisioning service along with information identifying the range of devices that are to be assigned to a same scope ID. The global provisioning service 120 generates another scope ID (e.g., AAA2), provides this scope ID back to Factory B in a scope ID designation 132, and also saves the scope ID in association with the device IDs ("Plug1", "Plug2", "Plug3") within the identity database 126.

Factories A and B hardcode the received scope IDs within each of the smart devices identified in respective scoping request. In the illustrated example, the scope ID 'AAA1' is hardcoded within each one of the smart devices 102 and the scope ID 'AAA2' is hardcoded within each one of the smart devices 104. In addition, each of the smart devices 102 and 104 is hardcoded to include the factory-assigned device ID (e.g., Plug1, Plug2, Plug3).

At some point in time prior to device initialization by an end user, the global provisioning service 120 may receive a smart hub identifier (not shown) in association with the assigned scope ID. The smart hub identifier may be, for example, an identifier that designates a particular TOT solution (e.g., smart hub 110) as a contact point for the initial provisioning of configuration instructions and/or device commanding during routine use. In some implementations, Factory A and/or Factory B provide the global provisioning service 120 with the smart hub identifier. In other implementations, the smart hub identifier is provided to the global provisioning service by a third party, such as a distributor or device operator, after the smart devices 102 or 104 are shipped from Factory A and Factory B. For example, a distributor may later transmit a smart hub designation request to the global provisioning service to designate a specific URI (e.g., the URI of the smart hub 110) in association with each of a number of specified scope ID and device ID pairs. The global provisioning service saves the smart hub identifier in the device identity database 126 in association with the specified scope ID and device ID pairs.

When the smart plug 108 is initialized (e.g., initially awoken from an off or low-power mode by an end user), the smart plug 108 transmits a registration request 122 to the global provisioning service 120. The registration request includes a device identification credential of the form (X, Y, Z), where X is the scope ID, Y is the device ID, and Z is a user-specified key, such as a key that a user creates in a mobile application that, during device set-up, provides the user-specified key to the smart plug 108. In the illustrated example, registration request 122 for the smart plug 108 includes the scope ID 'AAA2' and the device ID 'Plug1.' Since the global provisioning service 120 has assigned a unique scope ID in association with each received set of locally-unique device IDs, the identification credential is guaranteed to be globally unique within a network of smart hubs and smart devices in communication that utilize the global provisioning service 120 for device provisioning services.

Responsive to receipt of the registration request 122, the global provisioning service 120 attempts to authenticate the smart plug 108 by locating a matching scope ID-device ID pair within the device identity database 126 that matches a scope ID-device ID pair included within the identification credential specified by the registration request 122. When a matching scope ID-device ID pair is identified, the global provisioning service 120 accesses additional database information to identify the designated smart hub (if any), and (if applicable) contacts the designated smart hub (e.g., smart hub 110) to retrieve initial configuration information 124. The global provisioning service 120 ultimately answers the registration request 122 by relaying the initial configuration information 124 back to the smart plug 108. In some implementations, the global provisioning service 120 may provide the initial configuration information 124 back to the smart plug 108 without contacting a designated smart hub 110. For example, the global provisioning service 120 may be able to independently select a configuration for the smart plug 108.

In one implementation, the initial configuration information 124 returned to the smart plug 108 includes registration credentials for accessing the smart hub 110. For example, the global provisioning service 120 may perform actions to register the received device identification credential with the smart hub 110 and, responsive to successful registration, return an encrypted certificate that the smart plug 108 can later use to identify itself to the smart hub 110. In another implementation, the initial configuration information 124 includes connection information that the smart plug 108 can then later use to independently communicate with the smart hub 110. For example, the initial configuration information may include a URI of the smart hub 110. In another still another implementation, the initial configuration includes device configuration information, such as default device settings and/or user-specified settings.

When the smart plug 112 subsequently transmits its own registration request 128 to the global provisioning service 120, the global provisioning service 120 is able to uniquely authenticate the identity of the smart plug 112 due to the inclusion of the scope ID (AAA2), which differs from the scope ID of the smart plug 108. The global provisioning service 120 authenticates the smart plug 112 by locating a scope ID-device ID pair within the device identity database 126 that matches a scope ID-device ID pair included within the identification credential specified by the registration request 128. When a matching scope ID-device ID pair is identified, the global provisioning service 120 accesses additional database information to identify the designated smart hub (if any), contacts the designated smart hub (if applicable), retrieves/determines initial configuration information 130, and provides the initial configuration information 124 back to the smart plug 112.

Figure 2:
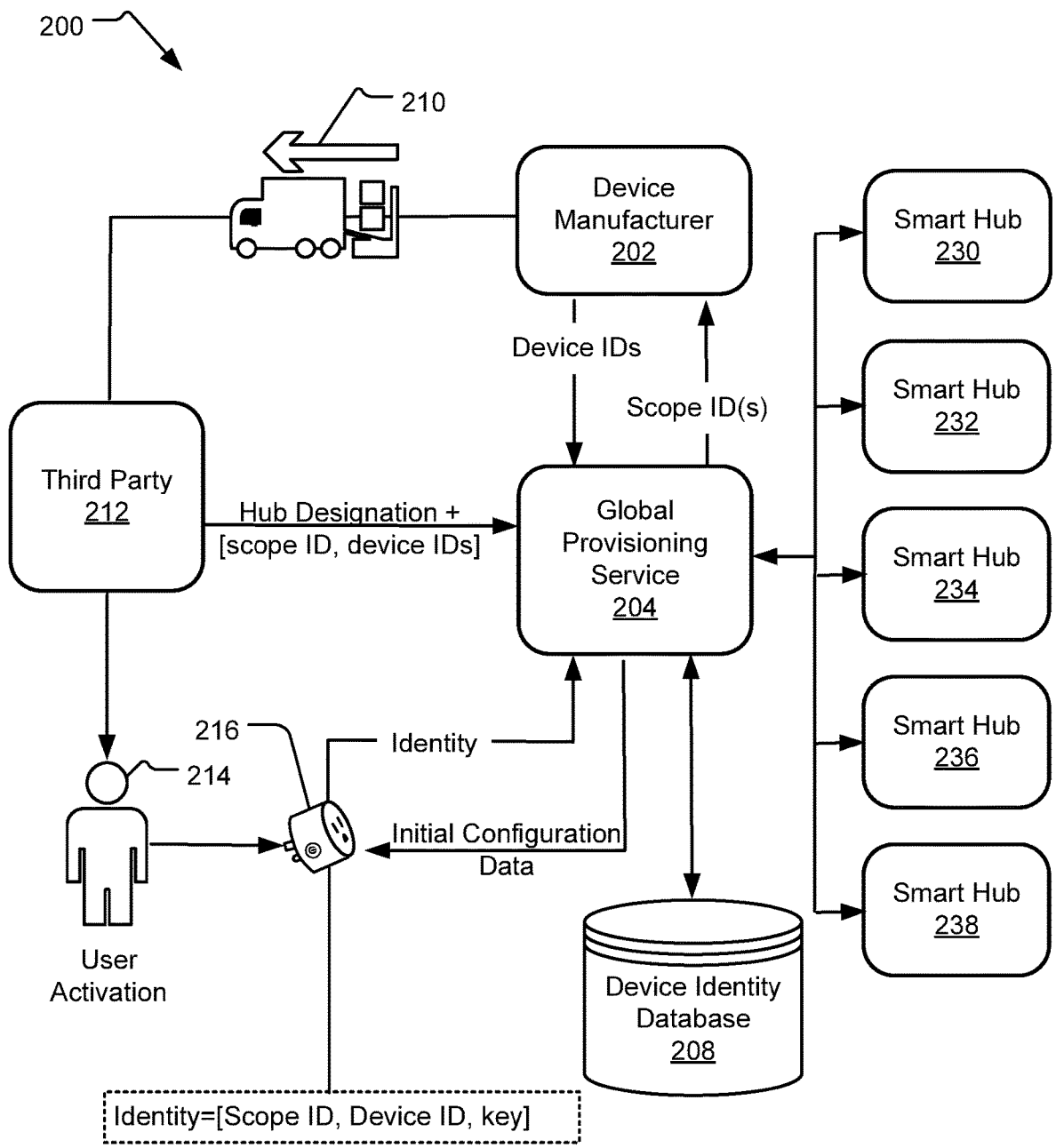
FIG. 2 illustrates another example system that utilizes a scoping mechanism as part of a device identity to allows each device to be recognized uniquely on the global scale.

FIG. 2 illustrates another example system 200 that utilizes a scoping mechanism as part of a device identity to allows each device to be recognized uniquely on a global scale. The system 200 includes a device manufacturer 202 that hardcodes each of a number of manufactured smart devices to include a locally-assigned device ID. The device manufacturer 202 transmits a scoping request to a global provisioning service 204 to request a scope ID that is to be assigned to one or more of the manufactured smart devices. In one implementation, the device manufacturer 202 requests a single scope ID for a range of identical products.

It is assumed that the device manufacturer 202 takes measures to ensure that either (1) each of its manufactured devices has a locally-unique device ID; or at least that (2) no two products having an identical device ID are assigned to a same scope ID. In some implementations, the device manufacturer 202 may request multiple scope ids simultaneously by specifying one or more device IDS that are to be assigned to each of scope ID.

Responsive to this request, the global provisioning service 204 generates one or more globally-unique scope IDs and saves the scope ID(s) in a device identity database 208 in association with the device IDs specified in the scoping request. The global provisioning service 204 provides the generated scope ID(s) to the device manufacturer 202 and, if there has been more than one scope ID requested, also provides the manufacturer with the identified subset of specified device IDs that have been assigned (in the device identity database 208) to each returned scope ID. The device manufacturer 202 hardcodes firmware of each smart device to include the scope ID assigned to each device in addition to the locally-assigned device ID.

The smart devices are loaded onto a truck 210 and delivered to a third-party 212, which may be higher supply chain manufacturer (e.g., a manufacturer integrating the received smart devices into another product for sale), a distributor, or other pre-sale device operator. The third party 212 designates a smart hub for one or more specified devices by transmitting a smart hub identifier to the global provisioning service 120 along with a collection of specified scope ID-device ID pairs. The smart hub identifier is, for example, an identifier that designates one of multiple smart hubs 230, 232, 234, 236, 238 as a contact point for the initial provisioning of configuration instructions and/or device commanding during routine use. For example, the smart hub 230 may be a web-based IOT solution service that is used to initially configure a smart device and/or command the smart device for an ongoing basis.

In some implementations, the device manufacturer 202 may designate a smart hub rather than the third party 212. In either case, the global provisioning service 120 saves the designated smart hub identifier in association with each one of the scope ID-device ID pairs specified by the third party 212.

When a user 214 purchases a particular smart device 216 (e.g., one of the smart devices produced by the device manufacturer 202 assigned a scope ID as described above), the user 214 powers on the device for the first time and may, in some cases, perform one or more set-up operations to provide the device with a key (passcode) that becomes part of a device identification credential for the smart device 216, along with the device's scope ID and device ID (e.g., Identity=(scopeID, deviceID, key)). In some implementations, the smart device 216 is configured for a more automated initialization process (e.g., one-touch initialization), in which case the global provisioning service 120 and/or smart device 216 may perform additional steps absent user input for determining a key, such as by determining a key already associated with a user account or assigning a new key.

Once the smart device 216 has integrated the key into its device identification credential, the smart device 216 determines a designated provisioning service endpoint (e.g., the global provisioning service 204), such as by referring to connection information that has been hardcoded by the device manufacturer 202. The smart device 216 transmits a registration request to the designated provisioning service endpoint and includes the device identification credential within the request. Using the scope ID and the device ID included in the registration request, the global provisioning service 204 attempts to authenticate the smart device 216 by locating a matching scope ID-device ID pair within the device identity database 208. Location of the matching database credentials serves to uniquely authenticate the smart device 216 since the aforementioned scope ID allocation process guaranteed that no two devices communicating with the global provisioning service 204 may share the same scope ID-device ID pair.

At this point, the global provisioning service 204 performs one or more device set-up operations and provisions the smart device 216 within initial configuration information. In one implementation, the global provisioning service 204 identifies a smart hub that has been designated by the third party 212 (e.g., one of smart hubs 230, 232, 242, 236, and 238) and transmits a registration request to the designated smart hub along with the device identification credential. Responsive to successful registration, the designated smart may provide the global provisioning service 204 with a registration credential, such as an encrypted key, that the smart device 216 may use to subsequently authenticate its identity to the designated smart hub. This encrypted key may be included in the initial configuration information that the global provisioning service 204 provisions back to the smart device 216 in response to the registration request.

In addition to registering the smart device 216 with a designated smart hub, the global provisioning service 204 may also provision the smart device 216 with connection information for contacting its designated smart hub. For example, the initial configuration data may include a URI that the smart device 216 can then communicate with to obtain further configuration information, such as device settings and firmware updates. After the smart device 216 receives the initial configuration information including this connection info, the smart device 216 may subsequently initiate a direct communication with the designated smart hub using the connection information and, receive configuration instructions and other state information from the designated smart hub.

Once the smart device 216 is initialized and registered with a designated smart hub, as generally described above, the smart device 216 may be able to communicate directly with the designated smart hub, such as receive commands for performing various tasks that vary depending on both the nature of the smart device and the level of control that a user chooses to exercise via interactions with the designated smart hub. In one implementation, the designated smart hub acts as a portal between a smart device and a web-based mobile application with a user interface. For example, the user 214 provides inputs to the web-based mobile application and the web-based mobile application communicates with the designated smart hub to command the smart device (e.g., to adjust settings, control the device in real-time) and/or to receive and view data collected by the smart device.

Figure 3:
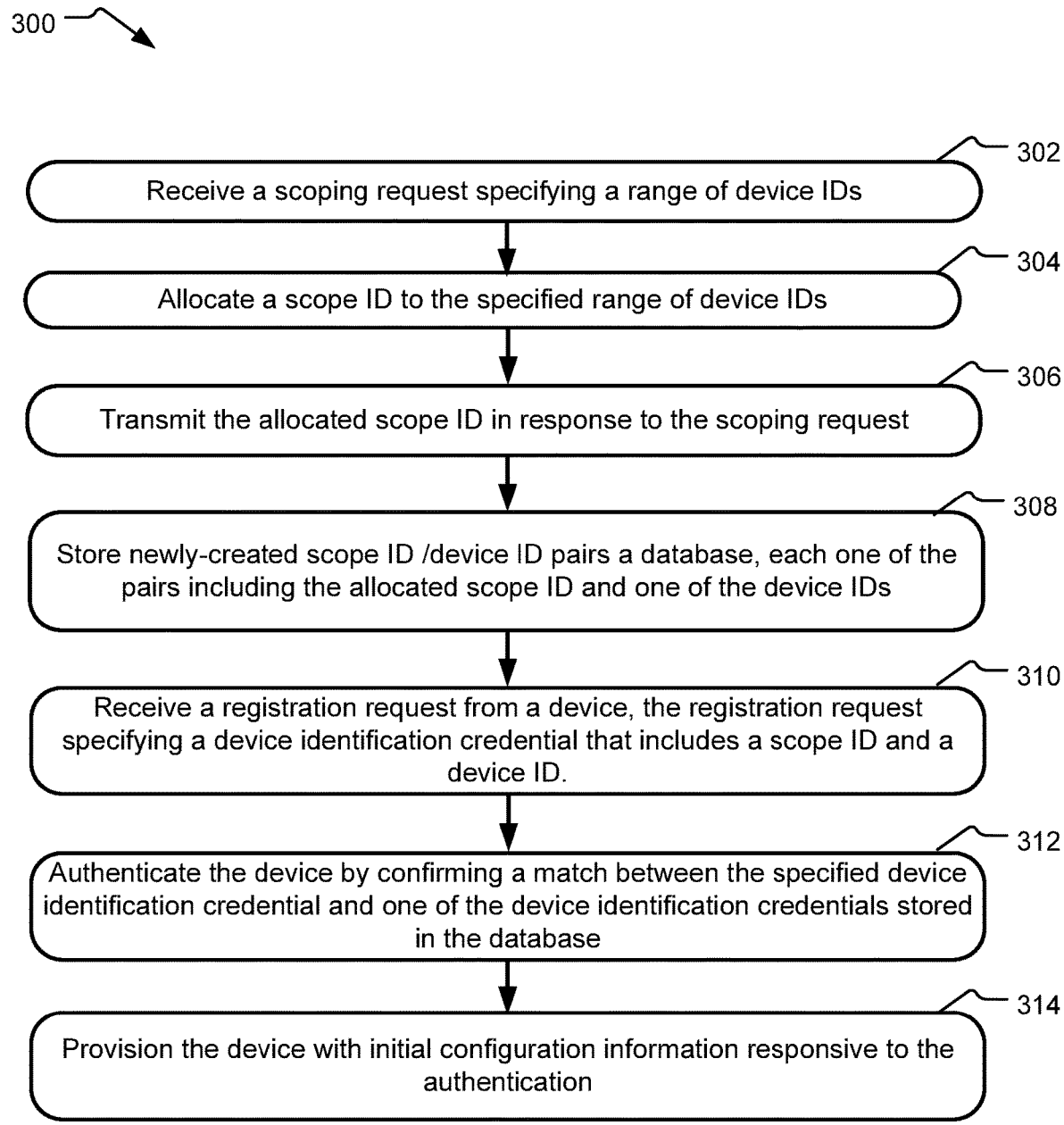
FIG. 3 illustrates example operations for uniquely authenticating a smart device.

FIG. 3 illustrates example operations 300 for uniquely authenticating a smart device. A receiving operation 302 receives a scoping request that specifies a range of device IDs that are assigned by a manufacturer. The device IDs may be locally-unique within the environment in which they are assigned. For example, a given manufacturer may implement procedures to ensure that no two products are assigned identical device IDs.

An allocation operation 304 allocates a scope ID to the specified range of device IDs responsive to the scoping request. A transmittal operation 306 transmits the allocated scope ID back to the entity that initiated the scoping request. For example, the transmittal operation 306 may transmit the allocated scope ID back to the manufacturer that initiated the scoping request. A storing operation 308 creates a memory association for each one of the newly-created scope ID/device ID pairs. Although the memory association may be two-dimensional (e.g., of the form [scope ID, device ID]), individual components of these two-dimensional stored device identification credentials can be compared to corresponding counterparts of a three-dimensional identification credential (e.g., of the form [scope ID, device ID, key] that is later received from a device during a registration request.

A receiving operation 310 receives a device registration request from a device. The registration request specifies a device identification credential including both a scope ID and a device ID. An authentication operation 312 authenticates the device by confirming a match between the specified device identification credential and one of the scope ID/device ID pairs stored in the database. A provisioning operation 314 provisions the device with initial configuration information responsive to the authentication.

Figure 4:
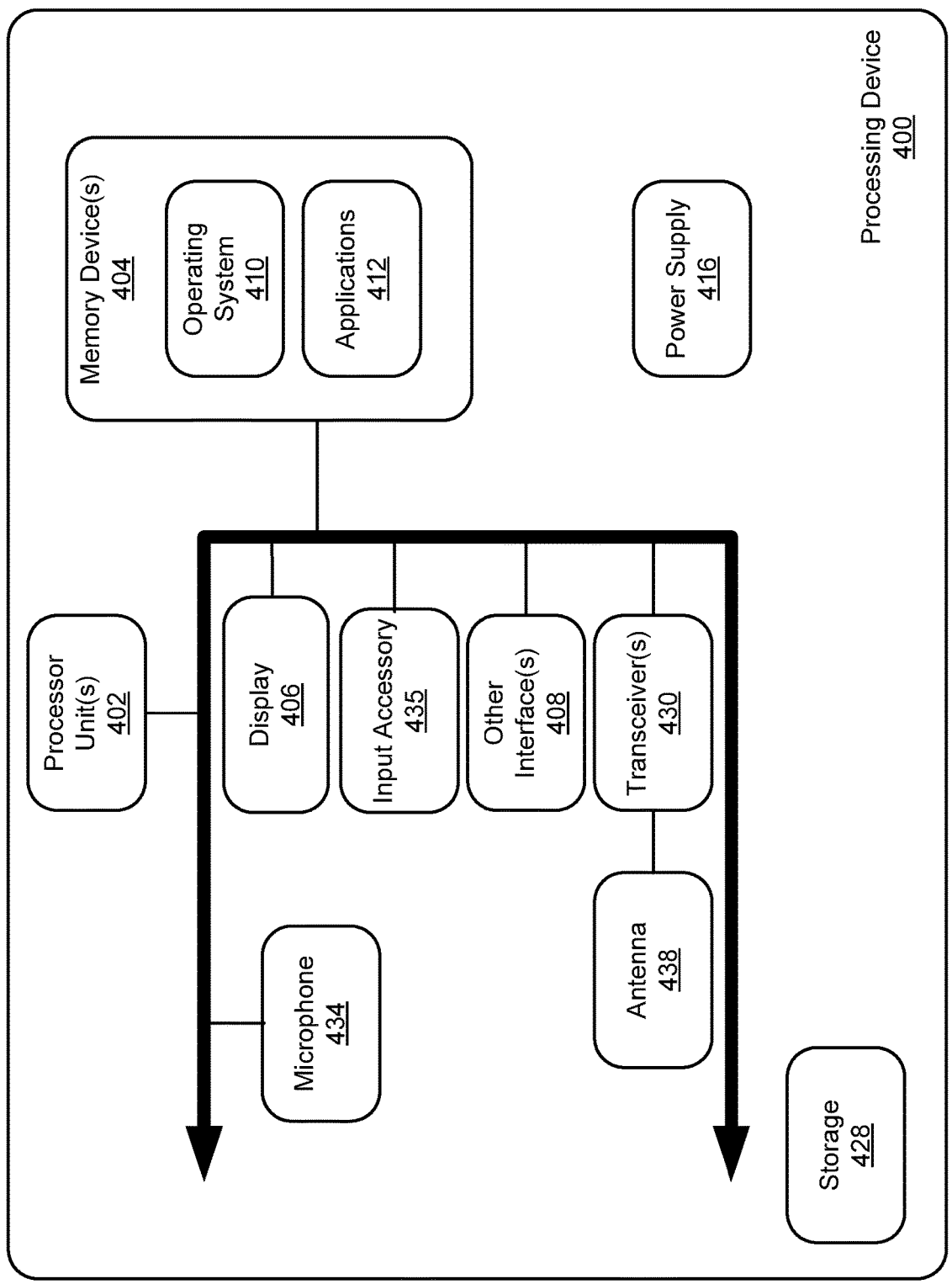
FIG. 4 illustrates an example schematic of a processing device suitable for implementing aspects of the disclosed technology.

FIG. 4 illustrates an example schematic of a processing device 400 suitable for implementing aspects of the disclosed technology. The processing device 400 includes one or more processor unit(s) 402, memory 404, a display 406, and other interfaces 408 (e.g., buttons). The memory 404 generally includes both volatile memory (e.g., RAM) and non-volatile memory (e.g., flash memory). An operating system 410, such as the Microsoft Windows® operating system, the Microsoft Windows® Phone operating system or a specific operating system designed for a gaming device, resides in the memory 404 and is executed by the processor unit(s) 402, although it should be understood that other operating systems may be employed.

One or more applications 412 are loaded in the memory 404 and executed on the operating system 410 by the processor unit(s) 402. Applications 412 may receive input from various input local devices such as a microphone 434, input accessory 435 (e.g., keypad, mouse, stylus, touchpad, gamepad, racing wheel, joystick). Additionally, the applications 412 may receive input from one or more remote devices such as remotely-located smart devices (e.g., smart devices 102 and 104 in FIG. 1) by communicating with such devices over a wired or wireless network using more communication transceivers 430 and an antenna 438 to provide network connectivity (e.g., a mobile phone network, Wi-Fi®, Bluetooth®). The processing device 400 may also include various other components, such as a positioning system (e.g., a global positioning satellite transceiver), one or more accelerometers, one or more cameras, an audio interface (e.g., the microphone 434, an audio amplifier and speaker and/or audio jack), and storage devices 428. Other configurations may also be employed.

The processing device 400 further includes a power supply 416, which is powered by one or more batteries or other power sources and which provides power to other components of the processing device 400. The power supply 416 may also be connected to an external power source (not shown) that overrides or recharges the built-in batteries or other power sources.

In an example implementation, a global provisioning service, smart hub, or smart device firmware may include hardware and/or software embodied by instructions stored in the memory 404 and/or the storage devices 428 and processed by the processor unit(s) 402. The memory 404 may be the memory of a host device or of an accessory that couples to the host.

The processing device 400 may include a variety of tangible computer-readable storage media and intangible computer-readable communication signals. Tangible computer-readable storage can be embodied by any available media that can be accessed by the processing device 400 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 400. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

An example method disclosed herein includes allocating a scope ID responsive to receipt of a scoping request indicating one or more device IDs and storing, in a database, one or more device identification credentials that each include the scope ID and an associated one of the device IDs. The method further includes receiving a registration request from a device specifying a device identification credential; authenticating uniqueness of a scope ID and a device ID included within the specified device identification credential by identifying a matching scope ID and device ID within one of the device identification credentials stored in the database; and provisioning the device through a network with initial configuration information responsive to the authentication of the scope ID and the device ID within the specified device identification credential for the device.

Another example method according to any preceding method further comprises receiving a smart hub designation request identifying a designated smart hub in association with the scope ID and a subset of the one or more device IDs; and storing, in the database, an identifier for the designated smart hub in association with a subset of the device identification credentials including the scope ID and one of the device IDs included in the subset specified by the smart hub designation request.

In still another example method of any preceding method, the initial configuration information includes connection information for communicating with the designated smart hub.

In yet still another example method of any preceding method, the method further comprises registering the specified device identification credential with the designated smart hub responsive to the authentication. The initial configuration information includes a registration credential from the designated smart hub.

In still another example method of any preceding method, the device is hardcoded to contact a global provisioning service instead of the designated smart hub.

In yet still another example method of any preceding method, each of the device identification credentials stored in the database includes a scope ID, a device ID, and a key that is set by a user.

In another example method of any preceding method, the initial configuration information includes configuration instructions provided by a designated smart hub.

An example system disclosed herein includes memory; a database; and a global provisioning service. The global provisioning service is stored in the memory and executable to allocate a scope ID responsive to receipt of a scoping request, the scoping request indicating one or more device IDs and store, in the database, one or more device identification credentials including the scope ID and an associated one of the device IDs. The global provisioning service is further executable to receive a registration request specifying a device identification credential for a device and authenticate uniqueness of a scope ID and a device ID included within the specified device identification credential by identifying a matching scope ID and device ID within one of the device identification credentials stored in the database. The global provisioning service provisions the device, through a network, with initial configuration information responsive to the authentication of the scope ID and the device ID within the specified device identification credential for the device.

In another example system of any preceding system, the global provisioning service is further executable to receive a smart hub designation request identifying a designated smart hub in association with the scope ID and a subset of the one or more device IDs and store, in the database, an identifier for the designated smart hub in association with a subset of the device identification credentials including the scope ID and one of the device IDs included in the subset specified by the smart hub designation request.

In still another example system of any preceding system, the initial configuration information includes connection information for communicating with the designated smart hub.

In still another example system of any preceding system, the global provisioning service is further executable to register the specified device identification credential with the designated smart hub responsive to the authentication. The initial configuration information includes a registration credential from the designated smart hub.

In yet still another example system of any preceding system, the device is hardcoded to contact a global provisioning service instead of the designated smart hub.

In yet still another example system of any preceding system, each of the device identification credentials stored in the database includes a scope ID, a device ID, and a key that is set by a user.

In still another example system of any preceding system, the initial configuration information includes configuration instructions provided by a designated smart hub.

An example memory device encodes computer-executable instructions for executing a computer process comprising: allocating a scope ID responsive to receipt of a scoping request, the scoping request indicating one or more device IDs; and storing, in a database, one or more device identification credentials including the scope ID and an associated one of the device IDs. The computer process further comprises receiving a registration request from a device, the registration request specifying a device identification credential; authenticating uniqueness of a scope ID and a device ID included within the specified device identification credential by identifying a matching scope ID and device ID within one of the device identification credentials stored in the database; and provisioning the device through a network with initial configuration information responsive to the authentication of the scope ID and the device ID within the specified device identification credential for the device.

In another example memory device according to any preceding memory device, the computer process further comprises receiving a smart hub designation request identifying a designated smart hub in association with the scope ID and a subset of the one or more device IDs; and storing, in the database, an identifier for the designated smart hub in association with a subset of the device identification credentials including the scope ID and one of the device IDs included in the subset specified by the smart hub designation request.

In yet still another example memory device according to any preceding memory device, the initial configuration information includes connection information for communicating with the designated smart hub.

In still another example memory device according to any preceding memory device, the computer process further includes registering the specified device identification credential with the designated smart hub responsive to the authentication, wherein the initial configuration information includes a registration credential from the designated smart hub.

In yet still another example memory device of any preceding memory device, each of the device identification credentials stored in the database includes a scope ID, device ID, and key that is set by a user.

In yet still another example memory device of any preceding memory device, the initial configuration information includes configuration instructions provided by a designated smart hub.

An example system disclosed herein includes a means for allocating a scope ID responsive to receipt of a scoping request indicating one or more device IDs and a means for storing one or more device identification credentials that each include the scope ID and an associated one of the device IDs. The method further includes a means for receiving a registration request from a device specifying a device identification credential; a means for authenticating uniqueness of a scope ID and a device ID included within the specified device identification credential by identifying a matching scope ID and device ID within one of the device identification credentials stored in the database; and a means for provisioning the device through a network with initial configuration information responsive to the authentication of the scope ID and the device ID within the specified device identification credential for the device.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A method comprising:
allocating a scope ID associated with one or more device IDs responsive to receipt of a scoping request, the scoping request indicating the one or more device IDs;
storing, in a database, one or more device identification credentials, each individual one of the device identification credentials including the scope ID and an associated one of the device IDs;
receiving a registration request from a device, the registration request specifying a device identification credential including the allocated scope ID and one of the device IDs associated with the device;
authenticating uniqueness of the allocated scope ID and the device ID associated with the device included within the specified device identification credential by identifying a matching scope ID and device ID associated with the device within one of the device identification credentials stored in the database; and
provisioning the device through a network with initial configuration information responsive to the authentication of the allocated scope ID and the device ID within the specified device identification credential for the device.

2. The method of claim 1, wherein the method further comprises:
receiving a smart hub designation request identifying a designated smart hub in association with the allocated scope ID and a subset of the one or more device IDs; and
storing, in the database, an identifier for the designated smart hub in association with a subset of the device identification credentials including the allocated scope ID and one of the device IDs included in the subset specified by the smart hub designation request.

3. The method of claim 2, wherein the initial configuration information includes connection information for communicating with the designated smart hub.

4. The method of claim 2, wherein the method further comprises:
registering the specified device identification credential with the designated smart hub responsive to the authentication, wherein the initial configuration information includes a registration credential from the designated smart hub.

5. The method of claim 2, wherein the device is hardcoded to contact a global provisioning service instead of the designated smart hub.

6. The method of claim 1, wherein each of the device identification credentials stored in the database includes an allocated scope ID, one of the device IDs, and a key that is set by a user.

7. The method of claim 1, wherein the initial configuration information includes configuration instructions provided by a designated smart hub.

8. A system comprising:
memory;
a database; and
a global provisioning service stored in the memory and executable to:
allocate a scope ID associated with one or more device IDs responsive to receipt of a scoping request, the scoping request indicating the one or more device IDs;
store, in the database, one or more device identification credentials, each individual one of the device identification credentials including the allocated scope ID and an associated one of the device IDs;
receive a registration request from a device, the registration request specifying a device identification credential including the allocated scope ID and one of the device IDs associated with the device;
authenticate uniqueness of the allocated scope ID and the device ID associated with the device included within the specified device identification credential by identifying a matching scope ID and device ID associated with the device within one of the device identification credentials stored in the database; and
provision the device through a network with initial configuration information responsive to the authentication of the allocated scope ID and the device ID within the specified device identification credential for the device.

9. The system of claim 8, wherein the global provisioning service is further executable to:
receive a smart hub designation request identifying a designated smart hub in association with the allocated scope ID and a subset of the one or more device IDs; and
store, in the database, an identifier for the designated smart hub in association with a subset of the device identification credentials including the allocated scope ID and one of the device IDs included in the subset specified by the smart hub designation request.

10. The system of claim 9, wherein the initial configuration information includes connection information for communicating with the designated smart hub.

11. The system of claim 9, wherein the global provisioning service is further executable to:
register the specified device identification credential with the designated smart hub responsive to the authentication, wherein the initial configuration information includes a registration credential from the designated smart hub.

12. The system of claim 11, wherein the device is hard-coded to contact the global provisioning service instead of the designated smart hub.

13. The system of claim 9, wherein each of the device identification credentials stored in the database includes an allocated scope ID, one of the device IDs, and a key that is set by a user.

14. The system of claim 9, wherein the initial configuration information includes configuration instructions provided by a designated smart hub.

15. One or more memory devices encoding computer-executable instructions for executing a computer process comprising:
allocating a scope ID associated with one or more device IDs responsive to receipt of a scoping request, the scoping request indicating the one or more device IDs;
storing, in a database, one or more device identification credentials, each individual one of the device identification credentials including the allocated scope ID and an associated one of the device IDs;
receiving a registration request from a device, the registration request specifying a device identification credential including the allocated scope ID and a device ID associated with the device;
authenticating uniqueness of the allocated scope ID and the device ID associated with the device included within the specified device identification credential by identifying a matching scope ID and device ID associated with the device within one of the device identification credentials stored in the database; and
provisioning the device through a network with initial configuration information responsive to the authentication of the allocated scope ID and the device ID within the specified device identification credential for the device.

16. The one or more memory device of claim 15, wherein the computer-executable instructions further comprise:
receiving a smart hub designation request identifying a designated smart hub in association with the allocated scope ID and a subset of the one or more device IDs; and
storing, in the database, an identifier for the designated smart hub in association with a subset of the device identification credentials including the allocated scope ID and one of the device IDs included in the subset specified by the smart hub designation request.

17. The one or more memory device of claim 16, wherein the initial configuration information includes connection information for communicating with the designated smart hub.

18. The one or more memory device of claim 16, wherein the computer-executable instructions further comprise:
registering the specified device identification credential with the designated smart hub responsive to the authentication, wherein the initial configuration information includes a registration credential from the designated smart hub.

19. The one or more memory device of claim 15, wherein each of the device identification credentials stored in the database includes an allocated scope ID, one of the device IDs, and key that is set by a user.

20. The one or more memory device of claim 15, wherein the initial configuration information includes configuration instructions provided by a designated smart hub.

* * * * *